US010405213B2

(12) United States Patent
Ni et al.

(10) Patent No.: US 10,405,213 B2
(45) Date of Patent: Sep. 3, 2019

(54) CALLED SERVICE PROCESSING METHOD, MOBILITY MANAGEMENT ENTITY, AND HOME SUBSCRIBER SERVER

(71) Applicant: Huawei Technologies Co., Ltd., Shenzhen (CN)

(72) Inventors: Guoyu Ni, Shanghai (CN); Rui Wang, Shanghai (CN); Guobao Xi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 117 days.

(21) Appl. No.: 15/599,246

(22) Filed: May 18, 2017

(65) Prior Publication Data

US 2017/0257784 A1 Sep. 7, 2017

Related U.S. Application Data

(63) Continuation of application No. PCT/CN2014/091588, filed on Nov. 19, 2014.

(51) Int. Cl.
*H04W 24/04* (2009.01)
*H04W 36/00* (2009.01)
(Continued)

(52) U.S. Cl.
CPC ............. *H04W 24/04* (2013.01); *H04W 8/04* (2013.01); *H04W 36/0022* (2013.01); *H04L 69/40* (2013.01)

(58) Field of Classification Search
CPC .... H04L 65/1016; H04L 69/40; H04W 48/18; H04W 36/0022; H04W 76/10; H04W 8/06; H04W 24/04; H04W 8/04
See application file for complete search history.

(56) References Cited

U.S. PATENT DOCUMENTS

2011/0176413 A1 7/2011 Tanabe et al.
2012/0134259 A1 5/2012 Bonnier et al.
(Continued)

FOREIGN PATENT DOCUMENTS

CN 101483896 A 7/2009
CN 102378208 A 3/2012
(Continued)

OTHER PUBLICATIONS

"Discussion on T-ADS Improvement solution," 3GPP TSG SA WG2 Meeting #84, Bratislava, Slovakia, S2-111601, XP50631592, 3rd Generation Partnership Project, Valbonne, France (Apr. 11-15, 2011).

(Continued)

*Primary Examiner* — Will W Lin
(74) *Attorney, Agent, or Firm* — Leydig, Voit & Mayer, Ltd.

(57) ABSTRACT

The present invention discloses a called service processing method, a mobility management entity, and a home subscriber server. The method includes: generating, by an MME, VOPS capability indication information according to a faulty state of a PGW after determining that the PGW in which UE is located is faulty, where the VOPS capability indication information is used to indicate that a network in which the UE is located does not support VOPS; and sending, by the MME, the VOPS capability indication information to an HSS. According to the called service processing method, the mobility management entity, and the home subscriber server provided in embodiments of the present invention, a called service is not affected after a PGW is faulty.

7 Claims, 7 Drawing Sheets

(51) Int. Cl.
*H04W 8/04* (2009.01)
*H04L 29/14* (2006.01)

(56) References Cited

U.S. PATENT DOCUMENTS

| | | | | |
|---|---|---|---|---|
| 2012/0269117 | A1* | 10/2012 | Hu | H04L 45/04 370/328 |
| 2012/0327852 | A1* | 12/2012 | Zisimopoulos | H04W 48/18 370/328 |
| 2013/0102315 | A1* | 4/2013 | Koshimizu | H04W 36/0022 455/436 |
| 2013/0272267 | A1* | 10/2013 | Nishida | H04W 8/08 370/331 |
| 2013/0329647 | A1* | 12/2013 | Keller | H04W 8/04 370/328 |
| 2015/0055554 | A1* | 2/2015 | Sedlacek | H04W 4/90 370/328 |
| 2015/0056986 | A1* | 2/2015 | Kim | H04W 8/02 455/432.1 |
| 2015/0295833 | A1* | 10/2015 | Mizukoshi | H04L 47/125 370/235 |
| 2016/0278132 | A1* | 9/2016 | Baek | H04W 4/90 |
| 2017/0280314 | A1* | 9/2017 | Yang | H04W 76/18 |

FOREIGN PATENT DOCUMENTS

| | | | |
|---|---|---|---|
| CN | 104010318 | A | 8/2014 |
| CN | 104137582 | A | 11/2014 |
| EP | 2819441 | A1 | 12/2014 |
| WO | WO 2010016518 | A1 | 2/2010 |
| WO | WO 2013125896 | A1 | 8/2013 |

OTHER PUBLICATIONS

"3rd Generation Partnership Project; Technical Specification Group Services and System Aspects; Architectural requirements (Release 13)," 3GPP TS 23.221, V13.0.0, XP50774097, pp. 1-52, 3rd Generation Partnership Project, Valbonne, France (Jun. 2014).

"3rd Generation Partnership Project; Technical Specification Group Services and System Aspects; Circuit Switched (CS) fallback in Evolved Packet System (EPS); Stage 2 (Release 11)," 3GPP TS 23.272, V11.9.0, pp. 1-100, 3rd Generation Partnership Project, Valbonne, France (Jun. 2014).

"3rd Generation Partnership Project; Technical Specification Group core Network and Terminals; Restoration procedures (Release 12)," 3GPP TS 23.007, V12.6.0, pp. 1-92, 3rd Generation Partnership Project, Valbonne, France (Sep. 2014).

* cited by examiner

CALLED SERVICE PROCESSING METHOD, MOBILITY MANAGEMENT ENTITY, AND HOME SUBSCRIBER SERVER

CROSS-REFERENCE TO RELATED APPLICATIONS

This application is a continuation of International Application No. PCT/CN2014/091588, filed on Nov. 19, 2014, the disclosure of which is hereby incorporated by reference in its entirety.

TECHNICAL FIELD

The present invention relates to the communications field, and more specifically, to a called service processing method, a mobility management entity, and a home subscriber server.

BACKGROUND

With development of Long Term Evolution (LTE) network technologies, an LTE network has covered some urban areas and traffic hotspot areas. In a current communications network, the LTE network coexists with a $2^{nd}$ Generation (2G)/a $3^{rd}$ Generation (3G) network. Because the LTE network is in a construction phase, some LTE networks may not support a voice service, but some LTE networks may support a voice service. In the LTE network that supports the voice service, user equipment (UE) may initiate a voice service by using voice over LTE (VoLTE). VoLTE is a technical solution in which only an LTE network is used and a voice packet is transmitted by using an LTE packet switched (PS) network. Therefore, network elements in the LTE network need to work normally, so that the voice service can be normally used. In addition, when initiating the voice service, the user equipment in the LTE network may first fall back to a 2G/3G network that has a circuit switched (CS) domain, performs the voice service in the 2G/3G network that has the circuit switched domain, and then returns to the LTE network after a conversation is completed. The technology of switching from a packet switched domain of an LTE network to a circuit switched domain of a 2G/3G network is referred to as a CSFB technology.

In the prior art, when both CSFB and VoLTE exist in a network, there is a complete mechanism for selecting CSFB or VoLTE to make a voice conversation. For a calling scenario, a user equipment performs selection based on a capability of the user equipment and a network capability. For example, if the user equipment supports both VoLTE and CSFB, and a network side also supports both VoLTE and CSFB, the user equipment preferably selects VoLTE or CSFB according to a preference of the user equipment. If the user equipment supports only CSFB, the user equipment selects only CSFB even if a network side supports both VoLTE and CSFB. For a called scenario, a network side selects a path (called party domain selection) for a voice service. For example, when a user equipment has performed Internet Protocol multimedia subsystem (IMS) registration, and the network side supports VoLTE, the network side preferably selects VoLTE for the user equipment to perform a service. However, in this case, if a packet data network gateway (PGW) is faulty, a called party cannot be connected.

SUMMARY

Embodiments of the present invention provide a called service processing method, a mobility management entity, and a home subscriber server, so that a called service is not affected after a PGW is faulty.

According to a first aspect, a called service processing method is provided, including:

generating, by a mobility management entity MME, voice over packet switch VOPS capability indication information according to a faulty state of a packet data network gateway PGW after determining that the PGW in which a user equipment UE is located is faulty, where the VOPS capability indication information is used to indicate that a network in which the user equipment is located does not support VOPS; and sending, by the MME, the VOPS capability indication information to a home subscriber server HSS.

With reference to the first aspect, in a first possible implementation manner, the generating, by a mobility management entity MME, voice over packet switch VOPS capability indication information according to a faulty state of a packet data network gateway PGW after determining that the PGW in which a user equipment UE is located is faulty includes:

after determining that the PGW in which the user equipment is located is faulty, receiving, by the MME, a domain selection data query request sent by the HSS, and generating the VOPS capability indication information according to the domain selection data query request and the faulty state of the PGW.

With reference to the first aspect or the first possible implementation manner of the first aspect, in a second possible implementation manner, before the generating voice over packet switch VOPS capability indication information according to a faulty state of a PGW, the method further includes:

determining, by the MME, that the PGW is faulty; and sending, by the MME, a network element notification message to the HSS, where the network element notification message is used to indicate that the HSS needs to query domain selection data in real time.

According to a second aspect, a called service processing method is provided, including:

receiving, by a home subscriber server HSS, voice over packet switch VOPS capability indication information sent by a mobility management entity MME, where the VOPS capability indication information is generated by the MME according to a faulty state of a packet data network gateway PGW after the MME determines that the PGW in which a user equipment UE is located is faulty; and sending, by the HSS, the VOPS capability indication information to an application server AS, where the VOPS capability indication information is used to instruct the application server to process a called service of the user equipment by means of circuit switched fallback CSFB.

With reference to the second aspect, in a first possible implementation manner, before the receiving, by a home subscriber server HSS, voice over packet switch VOPS capability indication information sent by a mobility management entity MME, the method further includes:

receiving, by the HSS, a domain selection data query notification sent by the application server; and responding, by the HSS, to the domain selection data query notification, and sending a domain selection data query request to the MME; and the receiving, by a home subscriber server HSS, voice over packet switch VOPS capability indication information sent by a mobility management entity MME includes:

receiving, by the HSS, the VOPS capability indication information sent by the MME, where the VOPS capability indication information is generated by the MME according to the domain selection data query request and the faulty state of the packet data network gateway PGW after the MME determines that the PGW in which the user equipment UE is located is faulty.

With reference to the first possible implementation manner of the second aspect, in a second possible implementation manner, before the receiving, by the HSS, a domain selection data query notification sent by the application server, the method further includes:

receiving, by the HSS, a network element notification message sent by the MME, where the network element notification message is used to indicate that the HSS needs to query domain selection data in real time.

With reference to the second aspect, in a third possible implementation manner, before the receiving, by the HSS, a domain selection data query notification sent by the application server, the method further includes:

receiving, by the HSS, a network element notification message sent by the MME, where the network element notification message is used to indicate that the HSS needs to query domain selection data in real time.

According to a third aspect, a mobility management entity MME is provided, including:

a determining module, configured to determine that a packet data network gateway PGW in which a user equipment UE is located is faulty;

a generation module, configured to generate voice over packet switch VOPS capability indication information according to a faulty state of the PGW after the determining module determines that the PGW in which the user equipment is located is faulty, where the VOPS capability indication information is used to indicate that a network in which the user equipment is located does not support VOPS; and a sending module, configured to send the VOPS capability indication information to a home subscriber server HSS.

With reference to the third aspect, in a first possible implementation manner, the generation module is specifically configured to: after the determining module determines that the PGW in which the user equipment is located is faulty, receive a domain selection data query request sent by the HSS, and generate the VOPS capability indication information according to the domain selection data query request and the faulty state of the PGW.

With reference to the third aspect or the first possible implementation manner of the third aspect, in a second possible implementation manner, the sending module is further configured to send a network element notification message to the HSS after the determining module determines that the PGW in which the user equipment is located is faulty and before the generation module generates the VOPS capability indication information, where the network element notification message is used to indicate that the HSS needs to query domain selection data in real time.

According to a fourth aspect, a home subscriber server HSS is provided, including:

a receiving module, configured to receive voice over packet switch VOPS capability indication information sent by a mobility management entity MME, where the VOPS capability indication information is generated by the MME according to a faulty state of a packet data network gateway PGW after the MME determines that the PGW in which a user equipment UE is located is faulty; and a sending module, configured to send the VOPS capability indication information to an application server AS, where the VOPS capability indication information is used to instruct the application server to process a called service of the user equipment by means of circuit switched fallback CSFB.

With reference to the fourth aspect, in a first possible implementation manner, the receiving module is further configured to receive, before receiving the VOPS capability indication information sent by the MME, a domain selection data query notification sent by the application server;

the sending module is further configured to: respond to the domain selection data query notification, and send a domain selection data query request to the MME; and the receiving module is specifically configured to receive the VOPS capability indication information sent by the MME, where the VOPS capability indication information is generated by the MME according to the domain selection data query request and the faulty state of the PGW after the MME determines that the packet data network gateway PGW in which the user equipment UE is located is faulty.

With reference to the first possible implementation manner of the fourth aspect, in a second possible implementation manner, the receiving module is further configured to receive, before receiving the domain selection data query notification sent by the application server, a network element notification message sent by the MME, where the network element notification message is used to indicate that the HSS needs to query domain selection data in real time.

With reference to the fourth aspect, in a third possible implementation manner, the receiving module is further configured to:

receive, before receiving the VOPS capability indication information sent by the MME, a domain selection data query notification sent by the application server; and the sending module is specifically configured to: respond to the domain selection data query notification, and send the VOPS capability indication information to the application server AS.

According to a fifth aspect, a system is provided, including:

the mobility management entity MME according to the third aspect and the home subscriber server HSS according to the fourth aspect.

With reference to the fifth aspect, in a first possible implementation manner, the system further includes:

an application server AS, configured to process a called service of a user equipment UE according to voice over packet switch VOPS capability indication information by means of circuit switched fallback CSFB.

According to a sixth aspect, an MME is provided, including: a processor and a memory, where the memory stores a program, and the processor executes the program to perform the called service processing method described in any one of the first aspect or the possible implementation manners of the first aspect.

According to a seventh aspect, an HSS is provided, including: a processor and a memory, where the memory stores a program, and the processor executes the program to perform the called service processing method described in any one of the second aspect or the possible implementation manners of the second aspect.

Based on the foregoing technical solutions, in the embodiments of the present invention, VOPS capability indication information that is generated according to a faulty state of a PGW in which a user equipment is located and that indicates that a network in which the user equipment is located does not support VOPS is sent to an HSS, and a called service of the user equipment may be processed by means of CSFB, so as to avoid a prior-art problem that a called party of the user equipment cannot be connected because the called service of the user equipment is still processed by means of VOLTE. Therefore, the called service is not affected after the PGW is faulty.

BRIEF DESCRIPTION OF DRAWINGS

To describe the technical solutions in the embodiments of the present invention more clearly, the following briefly describes the accompanying drawings for describing the embodiments of the present invention. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Figure 1:
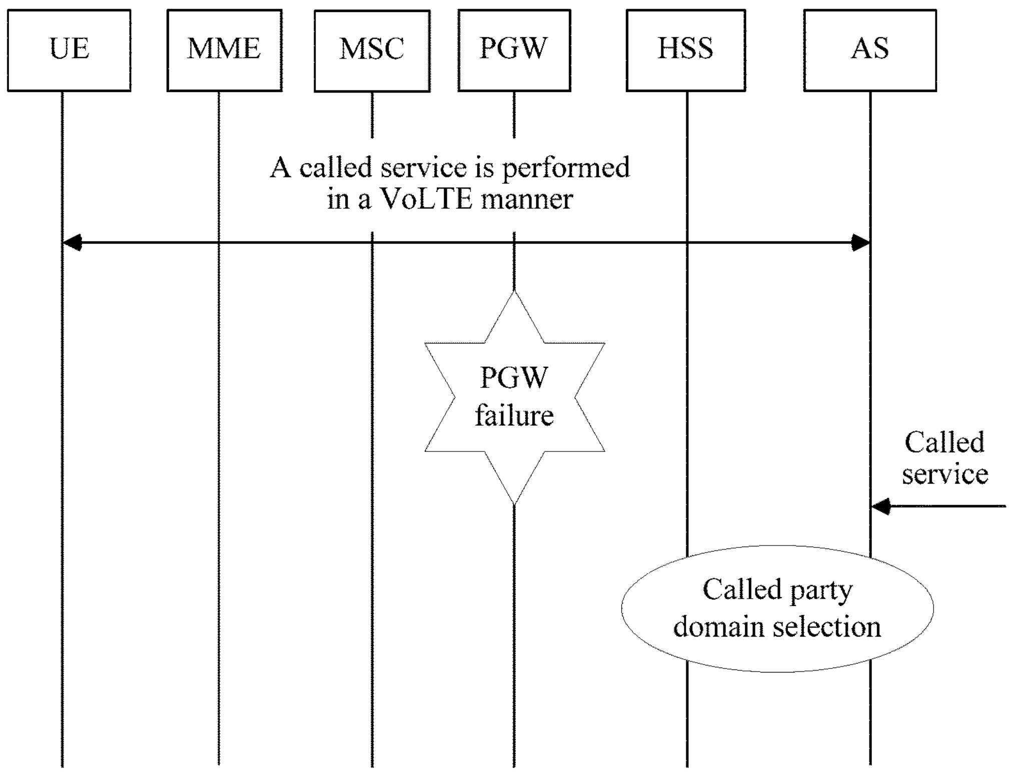
FIG. 1 is a schematic diagram of an application scenario according to an embodiment of the present invention.

FIG. 1 is a schematic diagram of an application scenario according to an embodiment of the present invention.

In the scenario shown in FIG. 1, a network side and a user equipment support both CSFB and VoLTE. The user equipment performs IMS registration after accessing a network, and subsequently, a network side of a called service preferably selects a VoLTE processing manner for the user equipment. In the VoLTE manner, data needs to pass through a PGW during transmission. If the VoLTE manner is still selected for the user equipment after the PGW is faulty, data transmission fails due to a PGW fault. Consequently, a called party cannot be connected.

It should be understood that, in the embodiments of the present invention, each entity such as a mobility management entity (MME), a home subscriber server (HSS), or an application server (AS) may be described as a network element or a device. Each entity may be a standalone device or may be a device disposed in another device.

It should be further understood that, in the embodiments of the present invention, user equipment (UE) may be referred to as a terminal, a mobile station (MS), a mobile terminal, or the like. The user equipment may communicate with one or more core networks through a radio access network (RAN). For example, the user equipment may be a mobile phone (also referred to as a "cellular" phone) or a computer with a mobile terminal. For example, the user equipment may also be a portable, pocket-sized, handheld, computer built-in, or in-vehicle mobile apparatus that exchanges a voice and/or data with the radio access network.

Figure 2:
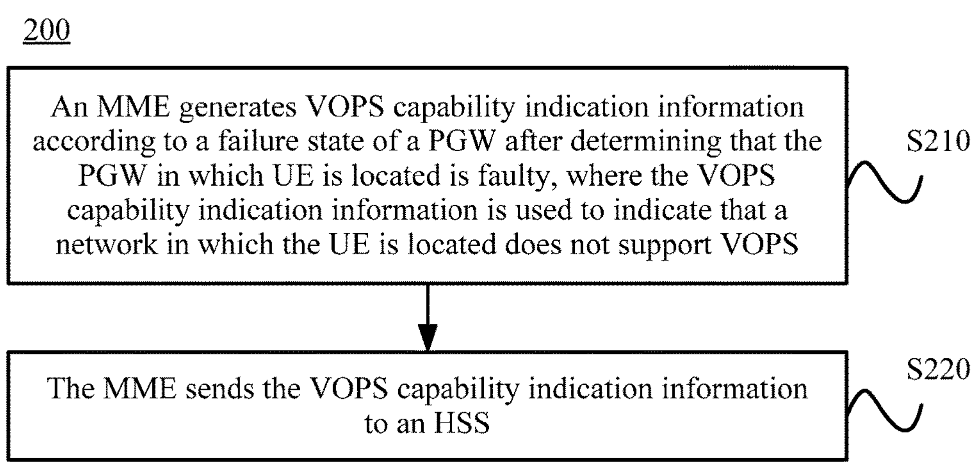
FIG. 2 is a schematic flowchart of a called service processing method according to an embodiment of the present invention.

FIG. 2 shows a schematic flowchart of a called service processing method 200 according to an embodiment of the present invention. The method 200 is performed by an MME. As shown in FIG. 2, the method 200 includes the following steps:

S210. An MME generates VOPS capability indication information according to a faulty state of a PGW after determining that the PGW in which a user equipment is located is faulty, where the VOPS capability indication information is used to indicate that a network in which the user equipment is located does not support VOPS.

S220. The MME sends the VOPS capability indication information to an HSS.

In this embodiment of the present invention, when the PGW in which the user equipment is located is faulty, the MME generates, according to the faulty state of the PGW in which the user equipment is located, the VOPS capability indication information indicating that the network in which the user equipment is located does not support voice over packet switch (VOPS), and sends the VOPS capability indication information to the HSS.

In the embodiments of the present invention, the faulty state of the PGW indicates that the PGW is faulty and cannot work normally. A state corresponding to the faulty state is a normal state of the PGW, and the normal state indicates that the PGW works normally and is not faulty. The faulty state of the PGW may be recorded when the PGW is faulty. During generation of the VOPS capability indication information, a status of the PGW may be queried, and the VOPS capability indication information is generated according to the faulty state, obtained by means of querying, of the PGW.

During called party domain selection, the HSS may send the VOPS capability indication information to an application server, and the application server may process a called service of the user equipment according to the VOPS capability indication information by means of CSFB, that is, the called service of the user equipment is continued by means of CSFB. In this way, a problem that a called party cannot be connected in a long time after the PGW is faulty can be avoided, and instantaneous sharp increase of signaling caused in voice service recovery after the PGW is faulty can also be avoided.

Therefore, according to the called service processing method provided in this embodiment of the present invention, VOPS capability indication information that is generated according to a faulty state of a PGW in which a user equipment is located and that indicates that a network in which the user equipment is located does not support VOPS is sent to an HSS, and a called service of the user equipment may be processed by means of CSFB, so that the called service is not affected after the PGW is faulty.

Optionally, in an embodiment of the present invention, that the MME generates VOPS capability indication information according to a faulty state of a PGW after determining that the PGW in which a user equipment is located is faulty includes:

after determining that the PGW in which the user equipment is located is faulty, the MME receives a domain selection data query request sent by the HSS, and generates the VOPS capability indication information according to the domain selection data query request and the faulty state of the PGW.

This embodiment may be applied to a scenario in which the HSS supports real-time domain selection data query. When receiving the domain selection data query request sent by the HSS, the MME generates the VOPS capability indication information according to the domain selection data query request and the faulty state of the PGW.

Optionally, in an embodiment of the present invention, before the generating the voice over packet switch VOPS capability indication information according to the faulty state of the PGW, the method 200 further includes:

the MME determines that the PGW is faulty; and the MME sends a network element notification message to the HSS, where the network element notification message is used to indicate that the HSS needs to query domain selection data in real time.

Specifically, if the HSS supports real-time domain selection data query, when determining that the PGW in which the user equipment is located is faulty, the MME may instruct the HSS to subsequently query the domain selection data in real time, and the HSS subsequently queries the domain selection data in real time according to the instruction. Alternatively, the HSS may query the domain selection data in real time without an instruction. The two cases are separately described in the following.

In an embodiment, after determining that the PGW in which the user equipment is located is faulty, the MME sends the network element notification message to the HSS and instructs the HSS to subsequently query the domain selection data in real time. The network element notification message is a device-level message, that is, the network element notification message carries device-level information rather than specific-user information, so that no extra signaling overheads are caused. According to the network element notification message, the HSS needs to subsequently query the domain selection data in real time, that is, the domain selection data needs to be queried during called party domain selection. When a called service arrives at the application server, the application server sends a domain selection data query notification such as a user information request to the HSS. The HSS queries the domain selection data in real time and sends a domain selection data query request such as a T-ADS (Terminating Access Domain Selection) data request to the MME. After receiving the domain selection data query request, the MME generates, according to the faulty state of the PGW in which the user equipment is located, the VOPS capability indication information indicating that the network in which the user equipment is located does not support VOPS, and sends the VOPS capability indication information to the HSS. The HSS sends the VOPS capability indication information to the application server. The application server continues the called service of the user equipment according to the VOPS capability indication information by means of CSFB. In this way, the user equipment falls back to a GU (GSM/UMTS) (Global System for Mobile communication/Universal Mobile Telecommunications System) network by means of CSFB, to connect a called phone.

Figure 3:
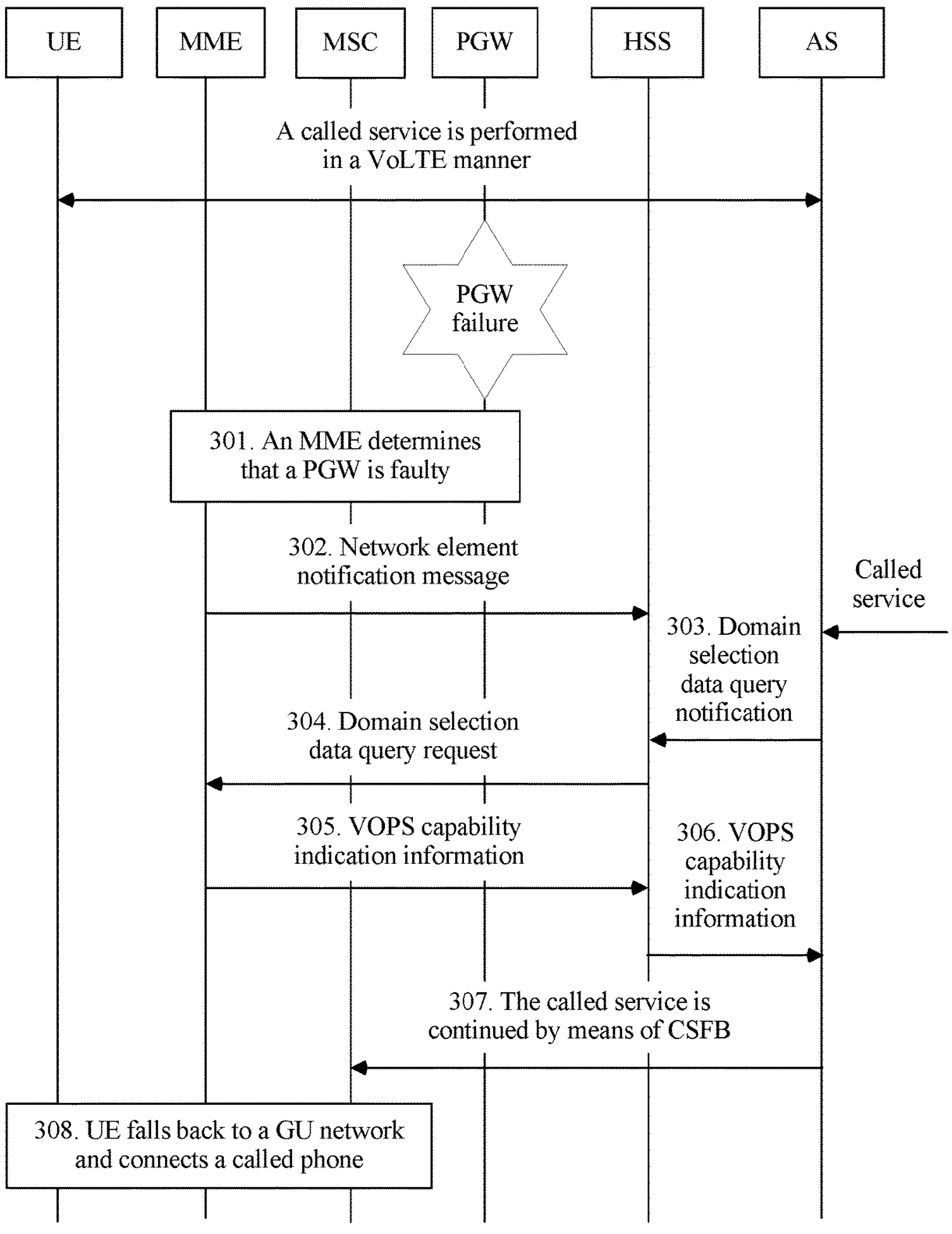
FIG. 3 is a schematic diagram of an interaction procedure of a called service processing method according to an embodiment of the present invention.

FIG. 3 is a schematic diagram of an interaction procedure according to an embodiment.

301. An MME determines that a PGW in which a user equipment is located is faulty.

302. The MME sends a network element notification message to an HSS.

For example, the network element notification message may be a NE Notification. The network element notification message indicates that the HSS needs to subsequently query domain selection data in real time.

303. An application server sends a domain selection data query notification to the HSS.

When a called service arrives at the application server, the application server selects a called party domain, and sends the domain selection data query notification to the HSS.

304. The HSS sends a domain selection data query request to the MME.

The HSS queries the domain selection data in real time, and sends the domain selection data query request to the MME. For example, the domain selection data query request may be an insert subscriber data request.

305. The MME sends VOPS capability indication information to the HSS.

After receiving the domain selection data query request sent by the HSS, the MME generates, according to a faulty state of the PGW in which the user equipment is located, the VOPS capability indication information indicating that a network in which the user equipment is located does not support VOPS, and sends the VOPS capability indication information to the HSS. For example, the MME sends, to the HSS, an insert subscriber data answer that carries the VOPS capability indication information.

306. The HSS sends the VOPS capability indication information to the application server.

307. The application server continues a called service of the user equipment by means of CSFB.

The application server continues the called service of the user equipment by means of CSFB according to the VOPS capability indication information indicating that the network in which the user equipment is located does not support VOPS.

308. The user equipment falls back to a GSM/UMTS network and connects a called phone.

In another embodiment, a network element notification message does not need to be sent to the HSS. Specifically, in this embodiment, after determining that the PGW in which the user equipment is located is faulty, the MME does not need to send the network element notification message to the HSS. When a called service arrives at the application server, the application server sends a domain selection data query notification to the HSS. The HSS queries domain selection data in real time, and sends a domain selection data query request to the MME. After receiving the domain selection data query request, the MME generates, according to a faulty state of the PGW in which the user equipment is located, VOPS capability indication information indicating that a network in which the user equipment is located does not support VOPS, and sends the VOPS capability indication information to the HSS. The HSS sends the VOPS capability indication information to the application server. The application server continues the called service of the user equipment according to the VOPS capability indication information by means of CSFB. In this way, the user equipment falls back to a GSM/UMTS network by means of CSFB, to connect a called phone.

Figure 4:
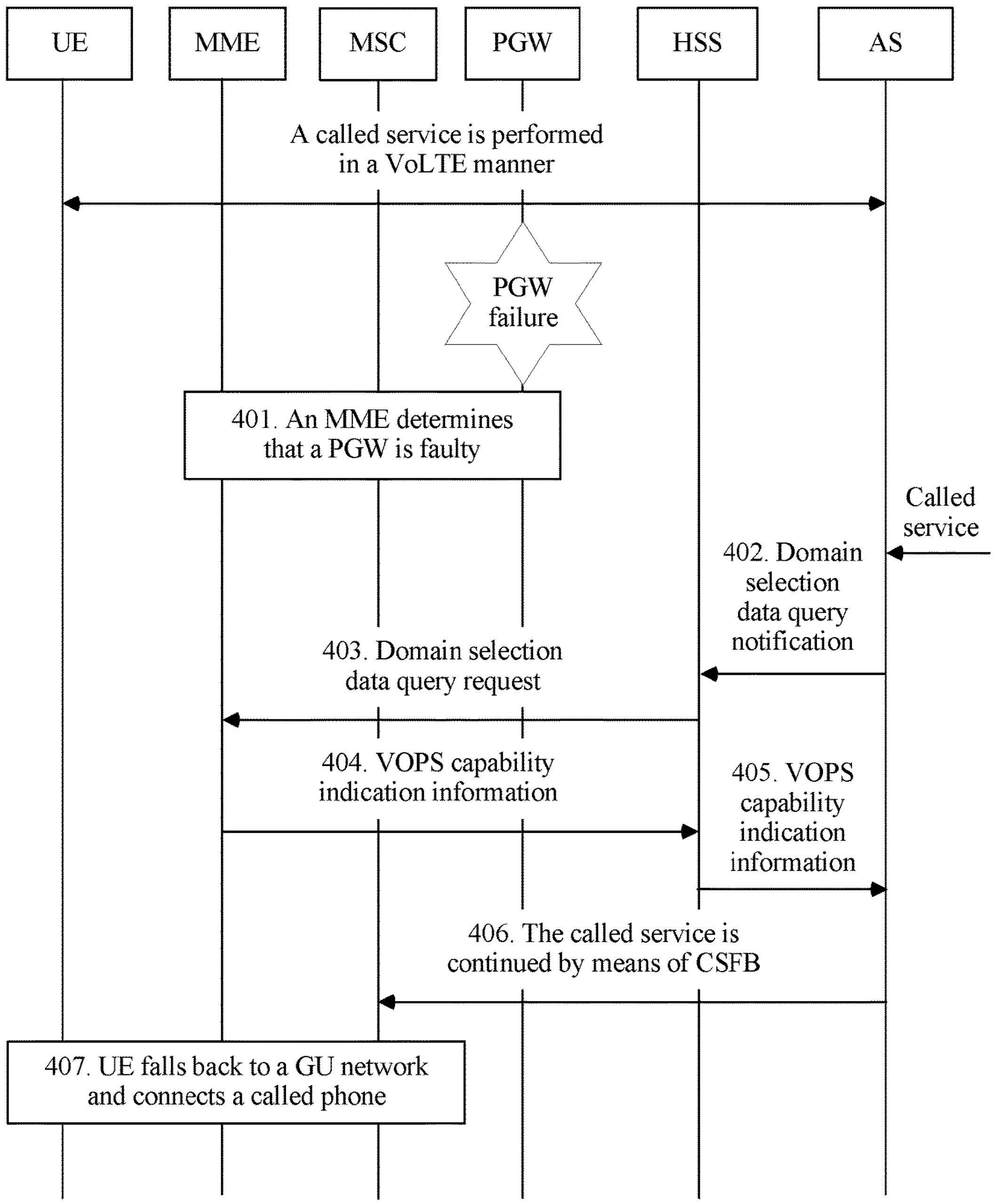
FIG. 4 is a schematic diagram of an interaction procedure of a called service processing method according to another embodiment of the present invention.

FIG. 4 is a schematic diagram of an interaction procedure according to an embodiment.

401. An MME determines that a PGW in which a user equipment is located is faulty.

402. An application server sends a domain selection data query notification to an HSS.

When a called service arrives at the application server, the application server selects a called party domain, and sends the domain selection data query notification to the HSS.

403. The HSS sends a domain selection data query request to the MME.

The HSS queries domain selection data in real time, and sends the domain selection data query request to the MME. For example, the domain selection data query request may be an insert subscriber data request.

404. The MME sends VOPS capability indication information to the HSS.

After receiving the domain selection data query request sent by the HSS, the MME generates, according to a faulty state of the PGW in which the user equipment is located, the VOPS capability indication information indicating that a network in which the user equipment is located does not support VOPS, and sends the VOPS capability indication information to the HSS. For example, the MME sends, to the HSS, an insert subscriber data answer that carries the VOPS capability indication information.

405. The HSS sends the VOPS capability indication information to the application server.

406. The application server continues a called service of the user equipment by means of CSFB.

The application server continues the called service of the user equipment by means of CSFB according to the VOPS capability indication information indicating that the network in which the user equipment is located does not support VOPS.

407. The user equipment falls back to a GSM/UMTS network and connects a called phone.

Optionally, in an embodiment of the present invention, in a scenario in which the HSS does not support real-time domain selection data query, after determining that the PGW in which the user equipment is located is faulty, the MME directly generates, according to a faulty state of the PGW in which the user equipment is located, VOPS capability indication information indicating that a network in which the user equipment is located does not support VOPS, and sends the VOPS capability indication information to the HSS. The MME may send the VOPS capability indication information by using a user-level message. The user-level message indicates that specific-user information is carried. For example, the MME may send a user-level message notification request (Notify Request) that carries the VOPS capability indication information. When a called service arrives at the application server, the application server sends a domain selection data query notification to the HSS. The HSS sends the previously received VOPS capability indication information to the application server. The application server continues the called service of the user equipment according to the VOPS capability indication information by means of CSFB. In this way, the user equipment falls back to a GSM/UMTS network by means of CSFB, to connect a called phone.

Figure 5:
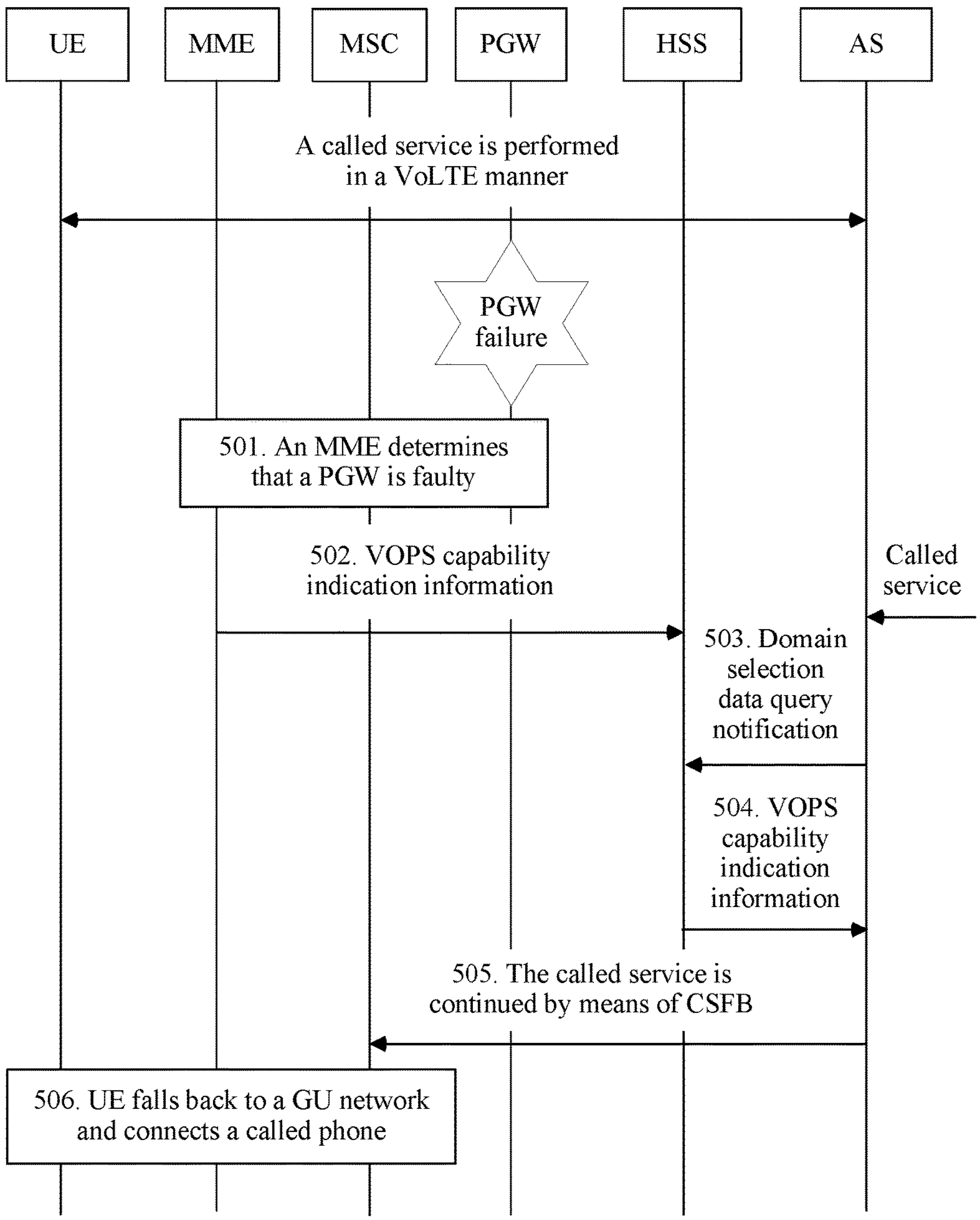
FIG. 5 is a schematic diagram of an interaction procedure of a called service processing method according to still another embodiment of the present invention.

FIG. 5 is a schematic diagram of an interaction procedure according to an embodiment.

501. An MME determines that a PGW in which a user equipment is located is faulty.

502. The MME sends VOPS capability indication information to an HSS.

After determining that the PGW in which the user equipment is located is faulty, the MME generates, according to a faulty state of the PGW in which the user equipment is located, the VOPS capability indication information indicating that a network in which the user equipment is located does not support VOPS, and sends the VOPS capability indication information to the HSS. For example, the MME sends, to the HSS, a notify request that carries the VOPS capability indication information.

503. An application server sends a domain selection data query notification to the HSS.

When a called service arrives at the application server, the application server selects a called party domain, and sends the domain selection data query notification to the HSS.

504. The HSS sends the VOPS capability indication information to the application server.

The HSS does not query domain selection data in real time, but sends the previously received VOPS capability indication information to the application server.

505. The application server continues a called service of the user equipment by means of CSFB.

The application server continues the called service of the user equipment by means of CSFB according to the VOPS capability indication information indicating that the network in which the user equipment is located does not support VOPS.

506. The user equipment falls back to a GSM/UMTS network and connects a called phone.

According to the called service processing method provided in this embodiment of the present invention, a called service is not affected after a PGW is faulty, and instantaneous sharp increase of signaling caused in voice service recovery after the PGW is faulty can also be avoided.

The called service processing method according to embodiments of the present invention is described above in detail from a perspective of an MME, and a called service processing method according to an embodiment of the present invention is described in the following from a perspective of an HSS.

Figure 6:
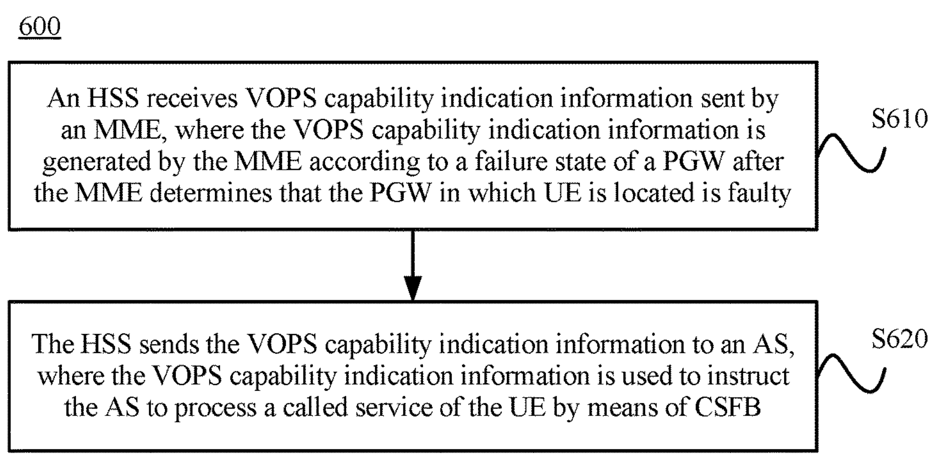
FIG. 6 is a schematic flowchart of a called service processing method according to another embodiment of the present invention.

FIG. 6 shows a schematic flowchart of a called service processing method 600 according to another embodiment of the present invention. The method 600 is performed by an HSS. As shown in FIG. 6, the method 600 includes the following steps:

S610. An HSS receives VOPS capability indication information sent by an MME, where the VOPS capability indication information is generated by the MME according to a faulty state of a PGW after the MME determines that the PGW in which a user equipment is located is faulty.

S620. The HSS sends the VOPS capability indication information to an application server, where the VOPS capability indication information is used to instruct the application server to process a called service of the user equipment by means of CSFB.

In this embodiment of the present invention, when the PGW in which the user equipment is located is faulty, the MME generates the VOPS capability indication information according to the faulty state of the PGW in which the user equipment is located. The VOPS capability indication information indicates that a network in which the user equipment is located does not support VOPS. The MME sends the VOPS capability indication information to the HSS, and the HSS sends the VOPS capability indication information to the application server. The application server may process the called service of the user equipment according to the VOPS capability indication information by means of CSFB, that is, the application server continues the called service of the user equipment by means of CSFB. In this way, a problem that a called party cannot be connected in a long time after the PGW is faulty can be avoided, and instantaneous sharp increase of signaling caused in voice service recovery after the PGW is faulty can also be avoided.

Therefore, according to the called service processing method provided in this embodiment of the present invention, VOPS capability indication information generated by an MME according to a faulty state of a PGW in which a user equipment is located is received, and the VOPS capability indication information is sent to an application server, so that the application server may process a called service of the user equipment by means of CSFB. Therefore, the called service is not affected after the PGW is faulty.

Optionally, in an embodiment of the present invention, before the HSS receives the VOPS capability indication information sent by the MME, the method 600 further includes:

the HSS receives a domain selection data query notification sent by the application server; and the HSS responds to the domain selection data query notification, and sends a domain selection data query request to the MME.

In this case, that an HSS receives VOPS capability indication information sent by an MME includes:

the HSS receives the VOPS capability indication information sent by the MME, where the VOPS capability indication information is generated by the MME according to the domain selection data query request and the faulty state of the PGW after the MME determines that the PGW in which the user equipment is located is faulty.

This embodiment may be applied to a scenario in which the HSS supports real-time domain selection data query. When receiving the domain selection data query notification sent by the application server, the HSS queries domain selection data in real time, and sends the domain selection data query request to the MME. When receiving the domain selection data query request sent by the HSS, the MME generates the VOPS capability indication information according to the domain selection data query request and the faulty state of the PGW.

Optionally, in an embodiment of the present invention, before the HSS receives the domain selection data query notification sent by the application server, the method 600 further includes:

the HSS receives a network element notification message sent by the MME, where the network element notification message is used to indicate that the HSS needs to query domain selection data in real time.

Specifically, if the HSS supports real-time domain selection data query, when determining that the PGW in which the user equipment is located is faulty, the MME may instruct the HSS to subsequently query the domain selection data in real time, and the HSS subsequently queries the domain selection data in real time according to the instruction. Alternatively, the HSS may query the domain selection data in real time without an instruction.

In an embodiment, after determining that the PGW in which the user equipment is located is faulty, the MME sends the network element notification message to the HSS and instructs the HSS to subsequently query domain selection data in real time. The network element notification message is a device-level message. According to the network element notification message, the HSS needs to subsequently query the domain selection data in real time, that is, the domain selection data needs to be queried during called party domain selection. When a called service arrives at the application server, the application server sends a domain selection data query notification to the HSS. The HSS queries the domain selection data in real time, and sends a domain selection data query request to the MME. After receiving the domain selection data query request, the MME generates, according to a faulty state of the PGW in which the user equipment is located, VOPS capability indication information indicating that a network in which the user equipment is located does not support VOPS, and sends the VOPS capability indication information to the HSS. The HSS sends the VOPS capability indication information to the application server. The application server continues the called service of the user equipment according to the VOPS capability indication information by means of CSFB. In this way, the user equipment falls back to a GSM/UMTS network by means of CSFB, to connect a called phone.

In another embodiment, a network element notification message does not need to be sent to the HSS. Specifically, in this embodiment, after determining that the PGW in which the user equipment is located is faulty, the MME does not need to send the network element notification message to the HSS. When a called service arrives at the application server, the application server sends a domain selection data query notification to the HSS. The HSS queries domain selection data in real time, and sends a domain selection data query request to the MME. After receiving the domain selection data query request, the MME generates, according to a faulty state of the PGW in which the user equipment is located, VOPS capability indication information indicating that a network in which the user equipment is located does not support VOPS, and sends the VOPS capability indication information to the HSS. The HSS sends the VOPS capability indication information to the application server. The application server continues the called service of the user equipment according to the VOPS capability indication information by means of CSFB. In this way, the user equipment falls back to a GSM/UMTS network by means of CSFB, to connect a called phone.

Optionally, in an embodiment of the present invention, after the HSS receives the VOPS capability indication information sent by the MME, the method 600 further includes:

the HSS receives a domain selection data query notification sent by the application server.

In this case, that the HSS sends the VOPS capability indication information to an application server includes:

the HSS responds to the domain selection data query notification, and sends the VOPS capability indication information to the application server AS.

This embodiment may be applied to a scenario in which the HSS does not support real-time domain selection data query. Specifically, in this embodiment, after determining that the PGW in which the user equipment is located is faulty, the MME directly generates, according to the faulty state of PGW in which the user equipment is located, the VOPS capability indication information indicating that a network in which the user equipment is located does not support VOPS, and sends the VOPS capability indication information to the HSS. The MME may send the VOPS capability indication information by using a user-level message. For example, the MME may send a user-level message Notify Request that carries the VOPS capability indication information. When a called service arrives at the application server, the application server sends a domain selection data query notification to the HSS. The HSS sends the previously received VOPS capability indication information to the application server. The application server continues the called service of the user equipment according to the VOPS capability indication information by means of CSFB. In this way, the user equipment falls back to a GSM/UMTS network by means of CSFB, to connect a called phone.

It should be understood that, in embodiments of the present invention, interaction between network elements, related features, functions, and the like that are described on an MME side are corresponding to those that are described on an HSS side. For brevity, details are not described herein.

According to the called service processing method provided in this embodiment of the present invention, a called service is not affected after a PGW is faulty, and instantaneous sharp increase of signaling caused in voice service recovery after the PGW is faulty can also be avoided.

It should be understood that sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

The called service processing methods according to the embodiments of the present invention are described above, and an MME and an HSS according to the embodiments of the present invention are described in the following.

Figure 7:
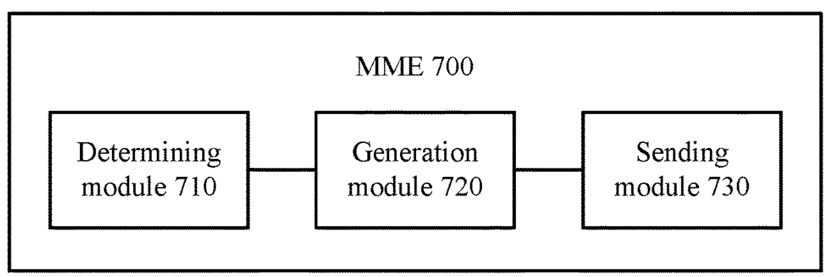
FIG. 7 is a schematic block diagram of an MME according to an embodiment of the present invention.

FIG. 7 shows a schematic block diagram of an MME 700 according to an embodiment of the present invention. As shown in FIG. 7, the MME 700 includes:

a determining module 710, configured to determine that a packet data network gateway PGW in which user equipment UE is located is faulty;

a generation module 720, configured to generate voice over packet switch VOPS capability indication information according to a faulty state of the PGW after the determining module 710 determines that the PGW in which the user equipment is located is faulty, where the VOPS capability indication information is used to indicate that a network in which the user equipment is located does not support VOPS; and a sending module 730, configured to send the VOPS capability indication information to a home subscriber server HSS.

The MME provided in this embodiment of the present invention sends, to an HSS, VOPS capability indication information that is generated according to a faulty state of a PGW in which a user equipment is located and that indicates that a network in which the user equipment is located does not support VOPS, and may process a called service of the user equipment by means of CSFB, so that the called service is not affected after the PGW is faulty.

In an example of the present invention, optionally, the generation module 720 is specifically configured to: after the determining module 710 determines that the PGW in which the user equipment is located is faulty, receive a domain selection data query request sent by the HSS, and generate the VOPS capability indication information according to the domain selection data query request and the faulty state of the PGW.

Figure 8:
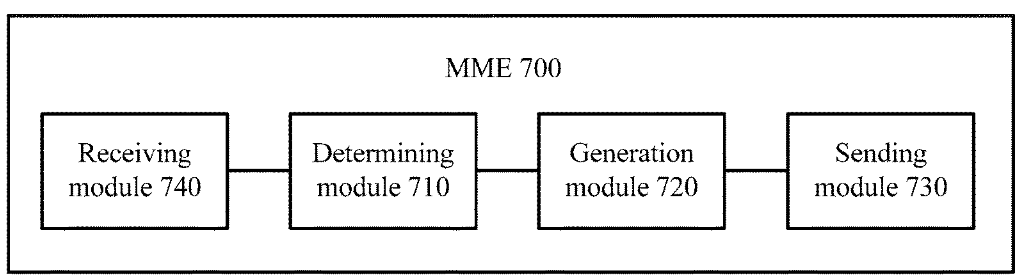
FIG. 8 is a schematic block diagram of an MME according to another embodiment of the present invention.

In an example of the present invention, optionally, the domain selection data query request may be received by a separate receiving module. For example, as shown in FIG. 8, the MME 700 further includes:

a receiving module 740, configured to receive, after the determining module 710 determines that the PGW in which the user equipment is located is faulty, a domain selection data query request sent by the HSS.

The generation module 720 is specifically configured to generate the VOPS capability indication information according to the domain selection data query request and the faulty state of the PGW.

In an example of the present invention, optionally, the sending module 730 is further configured to send a network element notification message to the HSS after the determining module 710 determines that the PGW in which the user equipment is located is faulty and before the generation module 720 generates the VOPS capability indication information. The network element notification message is used to indicate that the HSS needs to query domain selection data in real time.

The MME 700 according to this embodiment of the present invention may be corresponding to an MME in the called service processing method according to the embodiments of the present invention, and the foregoing and other operations and/or functions of modules in the MME 700 are separately used to implement corresponding procedures of the foregoing methods. For brevity, details are not described herein.

According to the MME provided in this embodiment of the present invention, a called service is not affected after a PGW is faulty, and instantaneous sharp increase of signaling caused in voice service recovery after the PGW is faulty can also be avoided.

Figure 9:
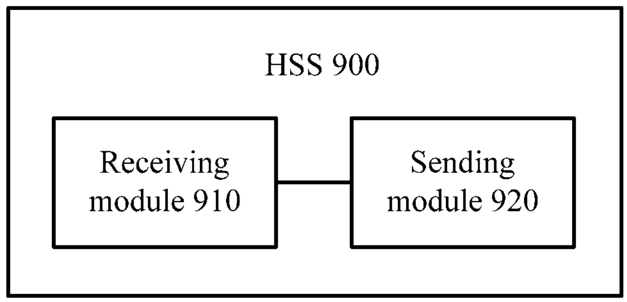
FIG. 9 is a schematic block diagram of an HSS according to an embodiment of the present invention.

FIG. 9 shows a schematic block diagram of an HSS 900 according to an embodiment of the present invention. As shown in FIG. 9, the HSS 900 includes:

a receiving module 910, configured to receive voice over packet switch VOPS capability indication information sent by a mobility management entity MME, where the VOPS capability indication information is generated by the MME according to a faulty state of a packet data network gateway PGW after the MME determines that the PGW in which user equipment UE is located is faulty; and a sending module 920, configured to send the VOPS capability indication information to an application server AS, where the VOPS capability indication information is used to instruct the application server to process a called service of the user equipment by means of circuit switched fallback CSFB.

The HSS in this embodiment of the present invention receives VOPS capability indication information generated by an MME according to a faulty state of a PGW in which a user equipment is located, and sends the VOPS capability indication information to an application server, so that the application server may process a called service of the user equipment by means of CSFB. Therefore, the called service is not affected after the PGW is faulty.

In an example of the present invention, optionally, the receiving module 910 is further configured to receive, before receiving the VOPS capability indication information sent by the MME, a domain selection data query notification sent by the application server.

The sending module 920 is further configured to: respond to the domain selection data query notification, and send a domain selection data query request to the MME.

The receiving module 910 is specifically configured to receive the VOPS capability indication information sent by the MME, where the VOPS capability indication information is generated by the MME according to the domain selection data query request and the faulty state of the PGW after the MME determines that the packet data network gateway PGW in which the user equipment UE is located is faulty.

In an example of the present invention, optionally, the receiving module 910 is further configured to receive, before receiving the domain selection data query notification sent by the application server, a network element notification message sent by the MME. The network element notification message is used to indicate that the HSS needs to query domain selection data in real time.

In an example of the present invention, optionally, the receiving module 910 is further configured to:

receive, before receiving the VOPS capability indication information sent by the MME, a domain selection data query notification sent by the application server; and the sending module 920 is specifically configured to: respond to the domain selection data query notification, and send the VOPS capability indication information to the application server AS.

The HSS 900 according to this embodiment of the present invention may be corresponding to an HSS in the called service processing method according to the embodiments of the present invention, and the foregoing and other operations and/or functions of modules in the HSS 900 are separately used to implement corresponding procedures of the foregoing methods. For brevity, details are not described herein.

According to the HSS in this embodiment of the present invention, a called service is not affected after a PGW is faulty, and instantaneous sharp increase of signaling caused in voice service recovery after the PGW is faulty can also be avoided.

Figure 10:
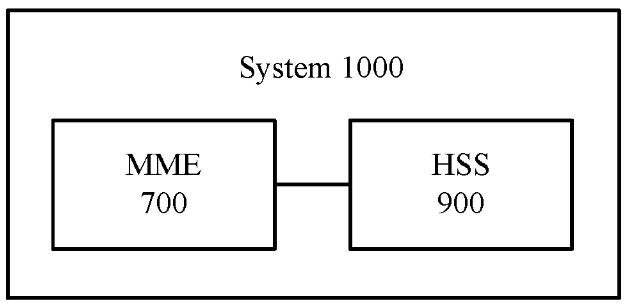
FIG. 10 is a schematic block diagram of a system according to an embodiment of the present invention.

An embodiment of the present invention further provides a system. As shown in FIG. 10, a system 1000 includes:

the MME 700 in the foregoing embodiment of the present invention and the HSS 900 in the embodiment of the present invention.

Figure 11:
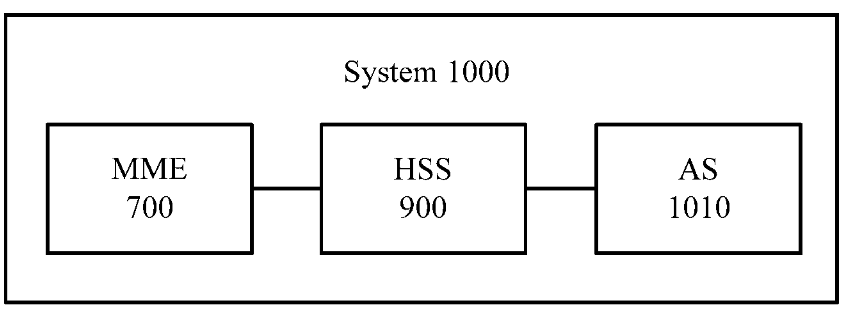
FIG. 11 is a schematic block diagram of a system according to another embodiment of the present invention.

In an example of the present invention, optionally, as shown in FIG. 11, the system 1000 further includes:

an application server 1010, configured to process a called service of user equipment UE according to voice over packet switch VOPS capability indication information by means of circuit switched fallback CSFB.

The application server 1010 may be corresponding to an application server in the called service processing method according to the embodiments of the present invention.

Figure 12:
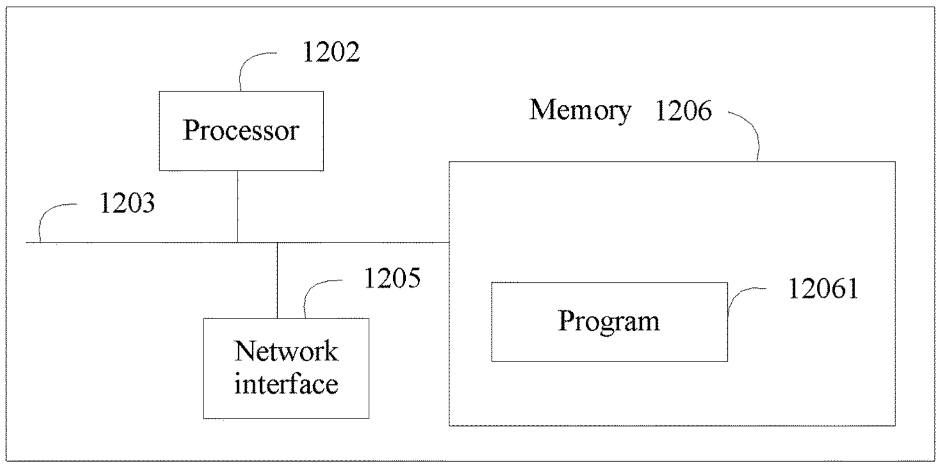
FIG. 12 is a schematic structural diagram of an MME according to still another embodiment of the present invention.

FIG. 12 shows a structure of an MME according to still another embodiment of the present invention. The MME includes at least one processor 1202 (for example, a central processing unit (CPU)), at least one network interface 1205 or another communications interface, a memory 1206, and at least one communications bus 1203 that is configured to implement connection and communication between these apparatuses. The processor 1202 is configured to execute an executable module, such as a computer program, stored in the memory 1206. The memory 1206 may include a high-speed random access memory (RAM), or may also include a non-volatile memory, such as at least one magnetic disk memory. Communication and connection between the MME and at least one another network element are implemented by using the at least one network interface 1205 (which may be wired or wireless).

In some implementation manners, the memory 1206 stores a program 12061, and the processor 1202 executes the program 12061 to perform the following operations:

generating voice over packet switch VOPS capability indication information according to a faulty state of a packet data network gateway PGW after determining that the PGW in which user equipment UE is located is faulty, where the VOPS capability indication information is used to indicate that a network in which the user equipment is located does not support VOPS; and sending the VOPS capability indication information to a home subscriber server HSS.

Optionally, the processor 1202 is configured to: after determining that the PGW in which the user equipment is located is faulty, receive a domain selection data query request sent by the HSS, and generate the VOPS capability indication information according to the domain selection data query request and the faulty state of the PGW.

Optionally, the processor 1202 is configured to: before generating the voice over packet switch VOPS capability indication information according to the faulty state of the PGW, determine that the PGW is faulty; and send a network element notification message to the HSS, where the network element notification message is used to indicate that the HSS needs to query domain selection data in real time.

It can be learned from the foregoing technical solution provided in this embodiment of the present invention, in this embodiment of the present invention, VOPS capability indication information that is generated according to a faulty state of a PGW in which a user equipment is located and that indicates that a network in which the user equipment is located does not support VOPS is sent to an HSS, and a called service of the user equipment may be processed by means of CSFB, so that the called service is not affected after the PGW is faulty.

Figure 13:
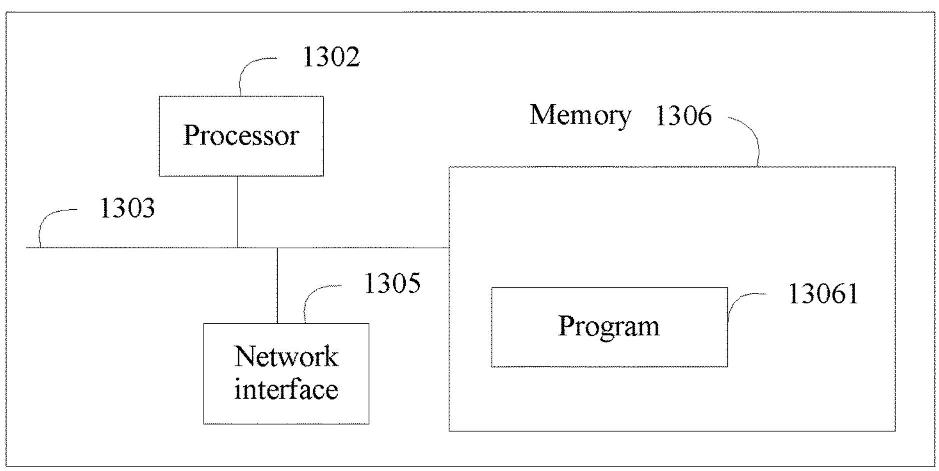
FIG. 13 is a schematic structural diagram of an HSS according to another embodiment of the present invention.

FIG. 13 shows a structure of an HSS according to another embodiment of the present invention. The HSS includes at least one processor 1302 (for example, a CPU), at least one network interface 1305 or another communications interface, a memory 1306, and at least one communications bus 1303 that is configured to implement connection and communication between these apparatuses. The processor 1302 is configured to execute an executable module, such as a computer program, stored in the memory 1306. The memory 1306 may include a high-speed random access memory (RAM), or may also include a non-volatile memory, such as at least one magnetic disk memory. Communication and connection between the HSS and at least one another network element are implemented by using the at least one network interface 1305 (which may be wired or wireless).

In some implementation manners, the memory 1306 stores a program 13061, and the processor 1302 executes the program 13061 to perform the following operations:

receiving voice over packet switch VOPS capability indication information sent by a mobility management entity MME, where the VOPS capability indication information is generated by the MME according to a faulty state of a packet data network gateway PGW after the MME determines that the PGW in which user equipment UE is located is faulty; and sending the VOPS capability indication information to an application server AS, where the VOPS capability indication information is used to instruct the application server to process a called service of the user equipment by means of circuit switched fallback CSFB.

Optionally, the processor 1302 is configured to: receive, before receiving the voice over packet switch VOPS capability indication information sent by the mobility management entity MME, a domain selection data query notification sent by the application server, respond to the domain selection data query notification, and send a domain selection data query request to the MME.

The processor 1302 is configured to receive the VOPS capability indication information sent by the MME. The VOPS capability indication information is generated by the MME according to the domain selection data query request and the faulty state of the PGW after the MME determines that the packet data network gateway PGW in which the user equipment UE is located is faulty.

Optionally, the processor 1302 is configured to receive, before receiving the domain selection data query notification sent by the application server, a network element notification message sent by the MME. The network element notification message is used to indicate that the HSS needs to query domain selection data in real time.

Optionally, the processor 1302 is configured to receive, after receiving the voice over packet switch VOPS capability indication information sent by the mobility management entity MME, a domain selection data query notification sent by the application server.

The processor 1302 is configured to: respond to the domain selection data query notification, and send the VOPS capability indication information to the application server application server.

It can be learned from the foregoing technical solution provided in this embodiment of the present invention, in this embodiment of the present invention, VOPS capability indication information generated by an MME according to a faulty state of a PGW in which a user equipment is located is received, and the VOPS capability indication information is sent to an application server, so that the application server may process a called service of the user equipment by means of CSFB. Therefore, the called service is not affected after the PGW is faulty.

It should be understood that, the specific examples in the present invention are merely intended to help a person skilled in the art better understand the embodiments of the present invention, but are not intended to limit the scope of the embodiments of the present invention.

It should be understood that, the term "and/or" in the embodiments of the present invention describes only an association relationship for describing associated objects and indicates that three relationships may exist. For example, A and/or B may represent the following three cases: Only A exists, both A and B exist, and only B exists. In addition, the character "/" in this specification generally represents an "or" relationship between the associated objects.

A person of ordinary skill in the art may be aware that example units and algorithm steps described with reference to the embodiments disclosed in this specification may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims. Additionally, statements made herein characterizing the invention refer to an embodiment of the invention and not necessarily all embodiments.

What is claimed is:

1. A called service processing method, comprising:

generating, by a mobility management entity (MME), voice over packet switch (VOPS) capability indication information in response to determining that a packet data network gateway (PGW) corresponding to a user equipment is faulty, wherein the VOPS capability indication information indicates that a network in which the user equipment is located does not support VOPS; and sending, by the MME, the VOPS capability indication information to a home subscriber server (HSS);

wherein before generating the VOPS capability indication information, the method further comprises:

determining, by the MME, that the PGW is faulty; and sending, by the MME, a network element notification message to the HSS, wherein the network element notification message indicates that the HSS needs to query domain selection data in real time.

2. The method according to claim 1, wherein generating the VOPS capability indication information comprises:

after determining that the PGW is faulty, receiving, by the MME, a domain selection data query request from the HSS, and generating the VOPS capability indication information based on the domain selection data query request and based on the PGW being faulty.

3. A mobility management entity (MME), comprising a processor and a non-transitory computer readable storage medium having processor-executable instructions stored thereon, wherein the processor-executable instructions, when executed by the processor, facilitate performance of the following:

determining that a packet data network gateway (PGW) corresponding to a user equipment is faulty;

generating voice over packet switch (VOPS) capability indication information in response to determining that the PGW is faulty, wherein the VOPS capability indication information indicates that a network in which the user equipment is located does not support VOPS; and sending the VOPS capability indication information to a home subscriber server (HSS);

wherein the processor-executable instructions, when executed by the processor, further facilitate: sending a network element notification message to the HSS after determining that the PGW is faulty and before generating the VOPS capability indication information, wherein the network element notification message indicates that the HSS needs to query domain selection data in real time.

4. The MME according to claim 3, wherein the processor-executable instructions, when executed, further facilitate: after determining that the PGW is faulty, receiving a domain selection data query request from the HSS; and wherein generating the VOPS capability indication information is based on the domain selection data query request and the PGW being faulty.

5. A home subscriber server (HSS), comprising a processor and a non-transitory computer readable storage medium having processor-executable instructions stored thereon, wherein the processor-executable instructions, when executed by the processor, facilitate performance of the following:

receiving voice over packet switch (VOPS) capability indication information from a mobility management entity (MME), wherein the VOPS capability indication information is generated by the MME based on a packet data network gateway (PGW) corresponding to a user equipment being faulty, and wherein the VOPS capability indication information indicates that a network in which the user equipment is located does not support VOPS; and sending the VOPS capability indication information to an application server for instructing the application server to process a called service of the user equipment via circuit switched fallback (CSFB);

wherein the processor-executable instructions, when executed, further facilitate:

before receiving the VOPS capability indication information from the MME, receiving a domain selection data query notification from the application server; and responding to the domain selection data query notification.

6. The HSS according to claim 5, wherein the processor-executable instructions, when executed, further facilitate:

sending a domain selection data query request to the MME;

wherein the VOPS capability indication information is generated by the MME according to the domain selection data query request and the PGW being faulty.

7. The HSS according to claim 6, wherein the processor-executable instructions, when executed, further facilitate: before receiving the domain selection data query notification from the application server, receiving a network element notification message from the MME, wherein the network element notification message indicates that the HSS needs to query domain selection data in real time.

* * * * *